(12) United States Patent
Gillen (10) Patent No.: US 11,755,988 B2
(45) Date of Patent: Sep. 12, 2023

(54) SYSTEMS AND METHODS FOR INITIATING ELECTRONIC REMEDIATION ACTIONS

(71) Applicant: United Parcel Service of America, Inc., Atlanta, GA (US)

(72) Inventor: Robert J. Gillen, Alpharetta, GA (US)

(73) Assignee: UNITED PARCEL SERVICE OF AMERICA, INC., Atlanta, GA (US)

( * ) Notice: Subject to any disclaimer, the term of this patent is extended or adjusted under 35 U.S.C. 154(b) by 817 days.

(21) Appl. No.: 16/441,367

(22) Filed: Jun. 14, 2019

(65) Prior Publication Data
US 2020/0394607 A1 Dec. 17, 2020

(51) Int. Cl.
G06Q 10/08 (2023.01)
G06Q 10/0837 (2023.01)
G06F 16/27 (2019.01)
G06Q 10/083 (2023.01)

(52) U.S. Cl.
CPC ......... *G06Q 10/0837* (2013.01); *G06F 16/27* (2019.01); *G06Q 10/0838* (2013.01)

(58) Field of Classification Search
CPC .. G06Q 10/08; G06Q 10/083; G06Q 10/0837; G06Q 10/0838
See application file for complete search history.

(56) References Cited

U.S. PATENT DOCUMENTS

| | | | |
|---|---|---|---|
| 2018/0211213 A1* | 7/2018 | Vivier | G06Q 10/0838 |
| 2018/0232693 A1 | 8/2018 | Gillen et al. | |
| 2019/0098432 A1* | 3/2019 | Carlson | H04W 4/70 |
| 2020/0211092 A1* | 7/2020 | Sarin | H04L 67/28 |

FOREIGN PATENT DOCUMENTS

EP 3451257 A1 3/2019

OTHER PUBLICATIONS

Retzlaff-Roberts, D. L., and Mark N. Frolick. "Reducing cycle time in reverse logistics." Cycle time research 3.1 (1997): 69-78. (Year: 1997).*
International Search Report and Written Opinion received for PCT Patent Application No. PCT/US2020/037192, dated Oct. 15, 2020, 11 pages.

* cited by examiner

*Primary Examiner* — Scott M Tungate
(74) *Attorney, Agent, or Firm* — Shook, Hardy & Bacon L.L.P.

(57) ABSTRACT

Embodiments of the present disclosure are directed to a system, methods, and computer-readable media for automatically initiating post-delivery action based on pre-tender diagnostic test results and post-delivery diagnostic test results stored in a distributed electronic ledger for a particular item. In embodiments, the post-delivery action can include, among other things, automatically initiating a return action such as generating shipment information for a return of the item, initiating an insurance action for the item, and/or communicating an electronic notification to the item seller and/or item purchaser. The post-delivery action can be stored in the distributed electronic ledger, and the post-delivery action can electronically trigger a cascade of returns, billing, communications, and/or insurance actions, among other things.

20 Claims, 6 Drawing Sheets

SYSTEMS AND METHODS FOR INITIATING ELECTRONIC REMEDIATION ACTIONS

BACKGROUND

Generally, an entity may sell electronic goods or services to consumers. After control of the electronic goods or services is passed to the consumer, for example by physical or virtual delivery of the electronic goods or services, the electronic goods or services may malfunction. An entity is generally unable to determine any such malfunction, and any extent of the malfunction at that time, as the electronic goods or services reside with the consumer. Additionally, the entity is generally unable to surmise whether consumer-inflicted misuse resulted in the malfunction, as opposed to rough package handling, for example.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The present invention is defined by the claims as supported by the Specification, including the Detailed Description and Drawings.

In brief and at a high level, various embodiments of the present invention provide systems, methods, and computer-readable media that leverage the immutability of the distributed electronic ledger to automatically initiate electronic actions based on pre-tender diagnostic test results and post-delivery diagnostic test results for an end-user computing device, wherein the pre-tender and post-delivery diagnosis test results are automatically determined and stored in a distributed electronic ledger.

In some embodiments, one or more non-transitory computer-readable media having computer instructions stored thereon for execution by one or more processors is provided, wherein execution of the computer instructions via the one or more processors results in a method. The method can include receiving shipment creation information for an item from an entity server, wherein the shipment creation information includes an item identifier for the item and pre-tender diagnostic information for the item. The method can further include generating a transaction including the shipment creation information based on the receipt thereof. The generated transaction can be communicated to a network, wherein a plurality of nodes of the network is configured to store the communicated transaction to a distributed ledger. The method can further include monitoring the distributed ledger, via the network, to detect when a subsequent transaction corresponding to the item identifier is stored in the distributed ledger, wherein the subsequent transaction includes post-delivery diagnostic information for the item. The method continues, for example, by receiving a notification from the entity server, indicating a determination that the post-delivery diagnostic information for the item is different than the pre-tender diagnostic information for the item. An electronic remediation action can then be generated based on the determination that the post-delivery diagnostic information included in the detected subsequent transaction is different than the pre-tender diagnostic information included in the stored transaction.

In some other embodiments, one or more non-transitory computer-readable media having computer instructions stored thereon for execution by one or more processors is provided, wherein execution of the computer instructions via the one or more processors results in a method. The method can include receiving shipment creation information for an item from an entity server, wherein the shipment creation information includes an item identifier for the item and pre-tender diagnostic information for the item. A transaction is generated that includes the shipment creation information based on the receipt thereof. The generated transaction can be communicated to a network, wherein a plurality of nodes of the network is configured to store the communicated transaction to a distributed ledger. The distributed ledger can be monitored, via the network, to detect when a subsequent transaction corresponding to the item identifier is stored in the distributed ledger, the subsequent transaction including post-delivery diagnostic information for the item. A notification from the entity server can be received, indicating a determination that the post-delivery diagnostic information for the item matches the pre-tender diagnostic information for the item. A determination can be made that an electronic remediation action is not to be generated based on the notification received indicating the determination that the post-delivery diagnostic information for the item matches the pre-tender diagnostic information for the item.

In some other embodiments, a system is provided. The system includes a server associated with a carrier entity. The server includes a communication component. The communication component can be configured for receiving shipment creation information for an item from an entity server, wherein the shipment creation information includes an item identifier for the item and pre-tender diagnostic information for the item. In some embodiments, the communication component is further configured for communicating a generated transaction to a network, wherein a plurality of nodes of the network is configured to store the communicated transaction to a distributed ledger. The communication component can be configured for receiving a notification from the entity server, indicating a determination that the post-delivery diagnostic information for the item is different than the pre-tender diagnostic information for the item. The system, in some embodiments, can include a transaction component configured for generating the transaction including the shipment creation information based on the receipt thereof. The server, in some embodiments, can include a surveillance component. The surveillance component is configured for monitoring the distributed ledger, via the network, to detect when a subsequent transaction corresponding to the item identifier is stored in the distributed ledger, wherein the subsequent transaction includes post-delivery diagnostic information for the item. The server can further include a remediation component configured for automatically generating an electronic remediation action based on the determination that the post-delivery diagnostic information included in the detected subsequent transaction is different than the pre-tender diagnostic information included in the stored transaction.

BRIEF DESCRIPTION OF THE DRAWINGS

Embodiments are described in detail below with reference to the attached drawings figures, wherein.

DETAILED DESCRIPTION OF THE INVENTION

The subject matter of the present invention is being described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step," "instance," and/or "block" can be used herein to connote different elements of methods employed, the terms should not be interpreted as implying any particular order among or between various steps herein disclosed unless and except when the order of individual steps is explicitly described. The present disclosure will now be described more fully herein with reference to the accompanying drawings, which may not be drawn to scale and which are not to be construed as limiting. Indeed, the present invention can be embodied in many different forms and should not be construed as limited to the embodiments set forth herein.

Figure 1:
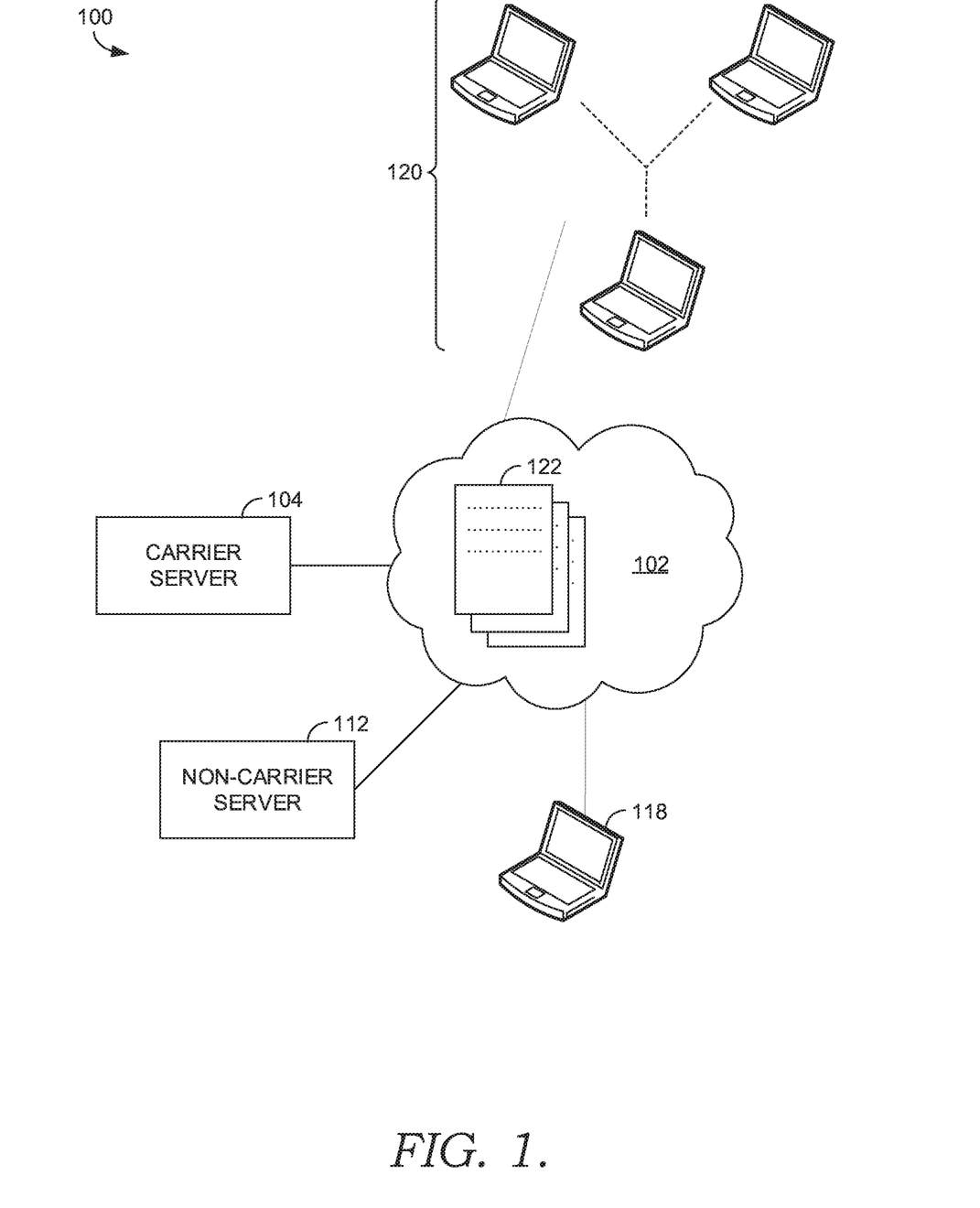
FIG. 1 illustrates a computing environment in accordance with an embodiment of the present invention.

FIG. 1 illustrates a computing environment 100 that is suitable for implementation of the present invention. The computing environment 100 of FIG. 1 comprises one or more servers. The one or more servers can communicate, directly or indirectly, with one another via a network 102. In one embodiment, the network 102 is a distributed network. As used herein, a distributed network is a network comprising one or more computing devices or nodes that are not located together, for example, such that the nodes of the network are remote from one another. It will be understood that a distributed network can be implemented for facilitating or enabling (e.g., receiving, processing, sending) any and all interactions discussed herein. The network 102 can include wireless and/or physical (e.g., hardwired) connections. Non-limiting examples of networks include a telecommunications network, Wide Area Network (WAN), a Local Area Network (LAN), a Wireless Local Area Network (WLAN), a Wi-Fi network, a short range wireless network, a Wireless Metropolitan Area Network (WMAN), a Bluetooth® capable network, a fiber optic network, or a combination thereof. The network 102 provides the one or more servers access to the Internet and web-based applications, in various embodiments.

Figure 2:
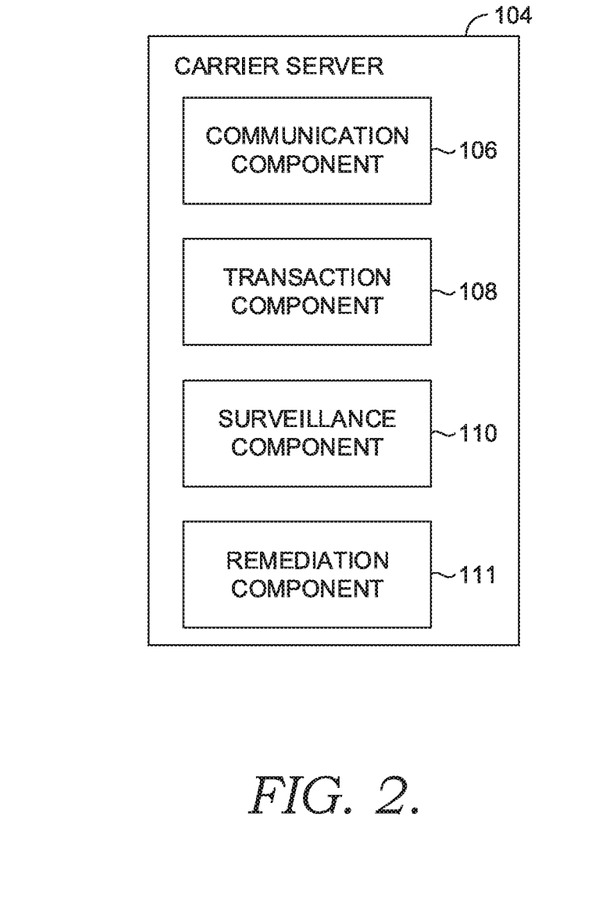
FIG. 2 illustrates a carrier server in accordance with an embodiment of the present invention.
Figure 3:
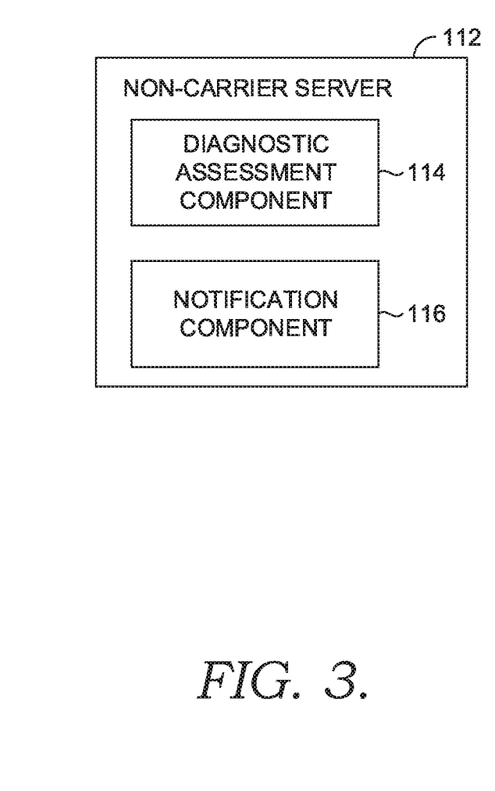
FIG. 3 illustrates a non-carrier server in accordance with an embodiment of the present invention.

In embodiments, one or more of the servers in the computing environment 100 is associated with components, those components being associated with a carrier entity, a non-carrier entity, an end-user entity, or a combination thereof. As shown in FIG. 1, the computing environment 100 comprises a carrier server 104, which is a server associated with a carrier entity. A carrier entity can be an entity that facilitates the organization and transportation of packages, parcels, and/or freight for shipment and delivery, in embodiments. In some embodiments, a carrier entity can further comprise an entity responsible for "last-mile delivery" or shipment fulfillment. It will be understood that the terms "carrier entity" and "carrier server" are not to be construed as limiting. For example, an entity and associated server can correspond to any company, retailer, wholesaler, and/or manufacturer, in some embodiments. Accordingly, the term "carrier" is used herein as an identifier so that a particular entity and associated server can be discussed and distinguished from other entities. As described herein, the carrier server 104 can comprise one or more of a communication component 106, a transaction component 108, a surveillance component 110, or a remediation component 111, as shown in FIG. 2. The computing environment 100 further comprises a non-carrier server 112, which is a server associated with a non-carrier entity. A non-carrier entity can be an entity that sells goods or services virtually, through an Internet connection, through an application (e.g., software), and/or through a brick-and-mortar storefront. A non-carrier entity can be an entity such a merchant entity, a retail entity, a wholesale entity, a refurbishing entity, a repair entity, and/or a secondary market entity (e.g., selling of a used item or a returned item). It will be understood that the terms "non-carrier entity" and "non-carrier server" are not to be construed as limiting. For example, an entity and associated server can correspond to any company, retailer, wholesaler, and/or manufacturer, in embodiments. Accordingly, the term "non-carrier" is used herein as an identifier so that a particular entity and associated server can be discussed and distinguished from other entities. In embodiments, the non-carrier server 112 can comprise, described herein, one or more of a diagnostic assessment component 114 or a notification component 116, as shown in FIG. 3. The computing environment 100 further comprises an end-user computing device 118, which is an electronic device that comprises a processor and memory, in embodiments. The terms "end-user computing device" and "item" are used interchangeably herein.

In embodiments, the carrier server 104, non-carrier server 112, the end-user computing device 118, or a combination thereof, can bi-directionally communicate with one another, whether the electronic communications are sent via direct links or indirect links. Additionally or alternatively, the carrier server 104, non-carrier server 112, the end-user computing device 118, or a combination thereof, can electronically communicate with one another using the network 102. Further, the carrier server 104, non-carrier server 112, the end-user computing device 118, or a combination thereof, can electronically communicate directly with one or more nodes 120 and/or directly with the distributed electronic ledger 122, which are connected to the network 102. In embodiments, each of the one or more nodes 120 is a remote computing device. Each of the one or more nodes 120 can manage the verification of transactions, the generation of transactions, and the storage of transactions to a distributed electronic ledger 122, in embodiments. However, it will be understood from the discussion hereinafter that because each of the carrier server 104, non-carrier server 112, the end-user computing device 118 can communicate directly with the distributed electronic ledger, each of the carrier server 104, non-carrier server 112, the end-user computing device 118 can manage the verification of transactions, the generation of transactions, and the storage of transactions to a distributed electronic ledger 122, in some embodiments. In accordance with embodiments described herein. A "transaction" can be defined as an electronic data object or other electronic data structure that is defined, stored, and/or generated by a computing device. In operation, the computing environment 100 facilitates interactions, whether direct or indirect, between the carrier server 104, non-carrier server 112, the end-user computing device 118, the one or more nodes 120, or a combination thereof.

At a high level, the components of the computing environment 100 leverage the immutability of the distributed electronic ledger 122 in order to, for example, automatically initiate electronic actions based on pre-tender diagnostic test results and post-delivery diagnostic test results for the end-user computing device 118 (i.e., "item"), the pre-tender and post-delivery diagnosis test results being stored in a distributed electronic ledger 122. An electronic action can comprise the non-carrier server 112 using the pre-tender diagnostic test results for the end-user computing device 118 and the post-delivery diagnostic test results for the end-user computing device 118 to determine whether the end-user computing device 118 is operational, is non-operational, and/or is operating within predetermined diagnostic thresholds and/or baselines (e.g. "normal" operations), in various embodiments. The diagnostic test results can quantify the functionality of the hardware and software operations of a system of the end-user computing device 118, in an embodiment. Additionally, in one example, the electronic action can comprise the non-carrier server 112 generating and communicating a notification, directly or indirectly, to the carrier server 104, regarding one or more determinations. The notification can include, additionally or alternatively, data encoding contact information and/or a unique identifier for an end-user associated with the end-user computing device, the end-user computing device 118 itself, and/or a request for carrier-provided services to be implemented regarding the end-user computing device 118. In a further example, the carrier server 104 can initiate an electronic action based on, or in response to, the notification received from the non-carrier server 112 regarding one or more determinations for the end-user computing device 118 and the operations of the end-user computing device 118. The carrier server 104 can initiate an electronic action such as an electronic remediation action. Non-limiting examples of electronic remediation actions can include generating electronic shipment information, generating a shipping label, requesting or authorizing a return authorization request (RMA), or a combination thereof. Further, the carrier server 104 can communicate the shipment information and/or a generated the shipping label to the non-carrier server 112, the end-user computing device 118, and/or another computing device associated with the end user (not shown). For example, a generated shipping label can be communicated to an alternative computing device associated with the end user or electronic account associated for the end user, so that the shipping label can be accessed by the end-user via the alternative computing device and/or account in the scenario where the end-user computing device 118 is determined to be non-operational. Non-limiting examples of electronic remediation actions can also include generating electronic notifications comprising warranty information, product registration information, and/or insurance information associated with the end-user computing device 118. For example, the carrier server 104 can communicate warranty and/or insurance information to the non-carrier server 112, the end-user computing device 118, and/or another computing device associated with a third party (not shown).

Figure 4:
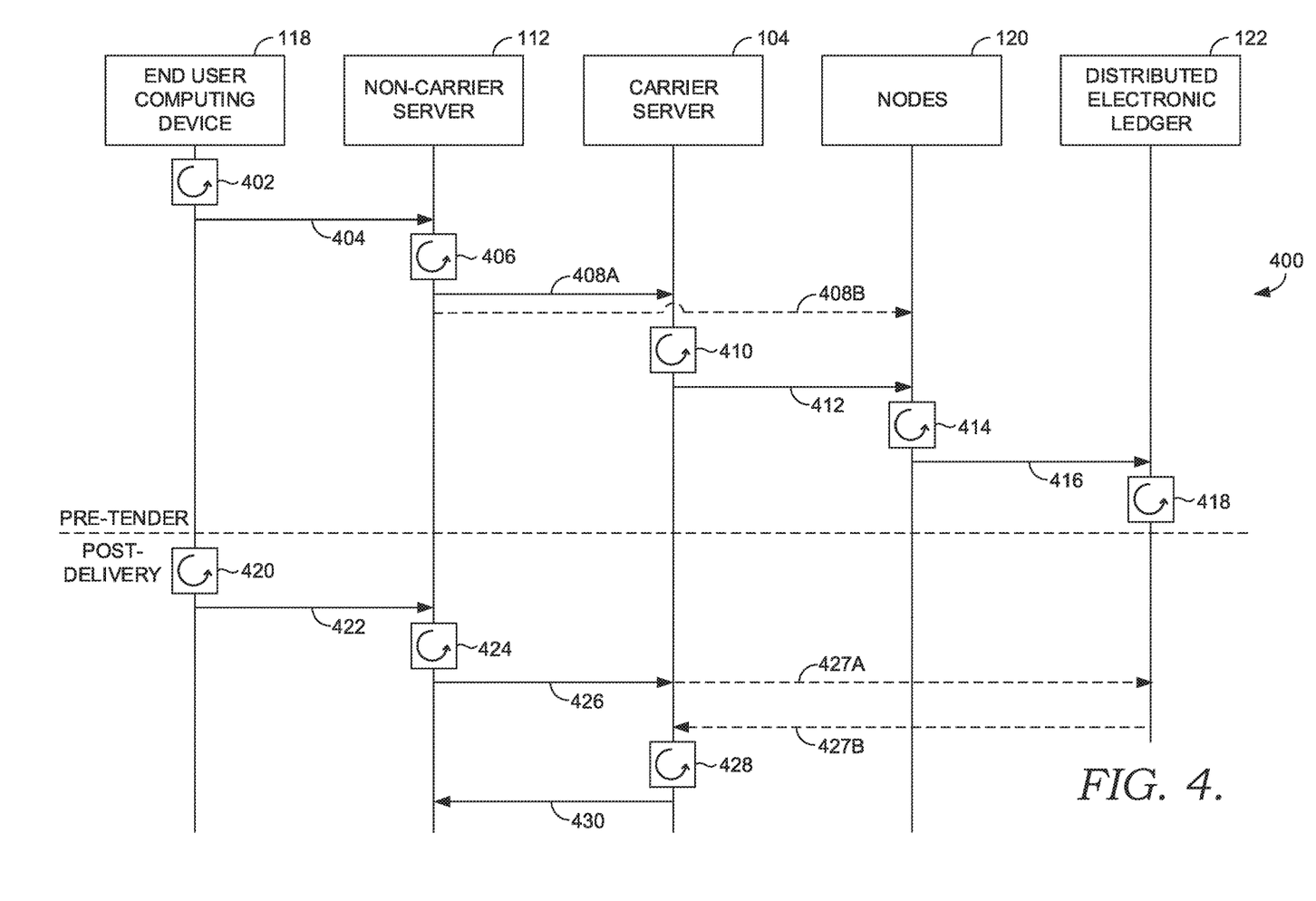
FIG. 4 illustrates a diagram of component interactions in accordance with an embodiment of the present invention.

As discussed above, the components of the computing environment 100 leverage a distributed electronic ledger 122 in order to automatically initiate electronic actions based on pre-tender diagnostic test results and post-delivery diagnostic test results for the end-user computing device 118. Discussed herein is a detailed description of the components of the computing environment 100, and their interactions with one another, including the one or more nodes 120 that perform the verification, generation, and storage of transactions to the distributed electronic ledger 122. Turning to FIG. 4, a diagram 400 of said component interactions is illustrated in accordance with an embodiment of the present invention.

Generally, a non-carrier entity, such as a seller entity, a merchant entity, a retail entity, a wholesale entity, a refurbishing entity, a repair entity, or a secondary market entity (e.g., selling of a used item or a returned item), has physical possession or control of the end-user computing device 118 (i.e., "item"). Prior to packaging and shipping the end-user computing device 118 to a location associated with an end user, a diagnostic tool can be used to determine whether the end-user computing device 118 is operational or non-operational. The diagnostic tool can be software or an application user interface (API) that is installed on the end-user computing device 118, and/or can be accessible at the end-user computing device 118 and/or through a network connection (e.g., the Internet). When the diagnostic tool is initiated, one or more diagnostic tests are performed, via one or more processors of the end-user computing device 118, shown at instance 402 in FIG. 4. In some aspects, the diagnostic tool can be initiated upon powering on the end-user computing device 118, whether for a predetermined number of times or an indeterminate number of times. In some further aspects, the diagnostic tool can be initiated upon a first boot (e.g., upon an initial starting or powering on just prior to packaging and/or shipping) and a second boot (e.g., upon an initial starting or powering on just after delivery), as will be described. Output (e.g., data encoding measurements) of the one or more diagnostic tests is recorded, regarding the functions and operations of software, hardware, or a combination thereof, of the end-user computing device 118. The output of the diagnostic tool can be communicated from the end-user computing device 118 to the non-carrier server 112 as shown in instance 404 of FIG. 4. However, in some embodiments, the output of the diagnostic tool can be communicated directly to the one or more nodes 120 or directly to the distributed electronic ledger 122.

In one embodiment, the end-user computing device 118 automatically initiates the diagnostic assessment in response to being powered "on," for example. In some embodiments, the non-carrier server 112 or the diagnostic assessment component 114 thereof initiates the diagnostic assessment for reporting on system performance of an item prior to tender of the item to a carrier entity for shipment. In some embodiments, the diagnostic assessment component 114 of the non-carrier server 112 can electronically communicate computer-readable instructions or a request to the end-user computing device 118, wherein the end-user computing device 118 executes the computer-readable instructions via one or more processors in order to perform one or more diagnostic tests and generate output from the one or more diagnostic tests. Generally, the output of the one or more diagnostic tests that are performed at the end-user computing device 118 prior to tender of the end-user computing device 118 to a carrier entity, can be an output that comprises pre-tender diagnostic information that is specific to the end-user computing device 118. Generally, pre-tender diagnostic information indicates diagnostic test results that report on system performance of the item as measured prior to tender of the item to a carrier entity. The pre-tender diagnostic information can be communicated directly to the one or more nodes 120 or directly distributed electronic ledger 122, in some embodiments. In another embodiment, the pre-tender diagnostic information can be communicated to one or more of the non-carrier server 112 or carrier server 104.

When the output of the diagnostic tool is communicated from the end-user computing device 118 to the non-carrier server 112, the diagnostic assessment component 114 can use the pre-tender diagnostic information located on the distributed electronic ledger 122 to determine whether the end-user computing device 118 is operational, is non-operational, and/or is operating within predetermined diagnostic thresholds and/or baselines (e.g. "normal" operations), as shown at instance 406 of FIG. 4. The pre-tender diagnostic information can quantify the functionality of the hardware and software operations of a system of the end-user computing device 118, in an embodiment. In some embodiments, the diagnostic assessment component 114 obtains raw data as output from the one or more diagnostic tests performed. In such an embodiment, the diagnostic assessment component 114 can receive raw data and generate pre-tender diagnostic information regarding the software and hardware operations and system performance of the item.

Additionally, the non-carrier server 112 or the diagnostic assessment component 114 thereof can associate the pre-tender diagnostic information of the output with a unique identifier, the unique identifier being associated with the end-user computing device 118, in some embodiments. In one embodiment, the non-carrier server 112 or the diagnostic assessment component 114 thereof can electronically associate or link a serial number of the end-user computing device 118 with the pre-tender diagnostic information. Additionally or alternatively, the non-carrier server 112 or the diagnostic assessment component 114 thereof can electronically associate or link an item identifier of the of the end-user computing device 118, a model number of the end-user computing device 118, a manufacturing date of the end-user computing device 118, a manufacturing batch number of the end-user computing device 118, a manufacturing location of the end-user computing device 118, a serial number of the end-user computing device 118, a serial number of one or more subcomponents of the end-user computing device 118, or a combination thereof, with the pre-tender diagnostic information. In an embodiment, the non-carrier server 112 can store the information and the links or associations between said information in local and/or remote memory. The non-carrier server 112 can communicate the information and the links or associations between said information to the carrier server 104, in an embodiment. As such, the non-carrier server 112 and/or the carrier server 104 can communicate the information and the links or associations between said information to the one or more nodes 120, via the network 102.

In embodiments, the notification component 116 of the non-carrier server 112 can send communications. In an embodiment, the non-carrier server 112 or the notification component 116 thereof electronically communicates information to the carrier server 104 regarding the end-user computing device 118, as shown at instance 408A of FIG. 4. Alternatively, in an embodiment, the non-carrier server 112 or the notification component 116 thereof electronically communicates information regarding the end-user computing device 118 directly to one or more nodes 120 or the distributed electronic ledger 122, thus bypassing the carrier server 104 as shown at instance 408B of FIG. 4. The information can comprise shipment creation information for the end-user computing device 118. Non-limiting examples of shipment creation information can include an item identifier for the end-user computing device 118, pre-tender diagnostic information for the end-user computing device 118, contact information for an end-user associated with the end-user computing device 118, geographic location associated with a destination (e.g., a physical mailing address whether residential or commercial, such as a carrier retail location and/or any intermediary shipping warehouses) for the end-user computing device 118, and the like, in various embodiments. Non-limiting examples of shipment creation information can include a service level for the end-user computing device 118, a service level for the non-carrier entity associated with the non-carrier server 112, handling instructions for the end-user computing device 118, handling instructions for the non-carrier entity associated with the non-carrier server 112, a service level associated with regulatory compliance for the end-user computing device 118, handling instructions associated with regulatory compliance for the end-user computing device 118, or a combination(s) thereof. The shipment creation information can include a request for a carrier entity associated with the carrier server 104 to create a shipping record for the end-user computing device 118, for example, in anticipation of, or in response to, tender of the end-user computing device 118 to the carrier entity for shipment, in embodiments. A request for performance of carrier entity services for the end-user computing device 118 can be generated by the non-carrier server 112 or the notification component 116 thereof, and included with the shipment creation information.

Accordingly, at instance 408, the carrier server 104 can receive the information, such as shipment creation information, from the non-carrier server 112 or from the distributed electronic ledger 122. In further embodiments, the communication component 106 of the carrier server 104 can receive the shipment creation information for the end-user computing device 118 from the non-carrier server 112, wherein the shipment creation information includes an item identifier for the of the end-user computing device 118 and pre-tender diagnostic information for the of the end-user computing device 118. The shipment creation information can comprise one or more of an item identifier, pre-tender diagnostic information, or a request for creation of a shipping record for the of the end-user computing device 118. The transaction component 108 of the carrier server 104 can generate a transaction including the shipment creation information based on the receipt thereof, as shown at instance 410 of FIG. 4. The transaction can comprise the shipment creation information, including pre-tender diagnostic information for the end-user computing device 118. The carrier server 104 or the communication component 106 thereof can communicate the generated transaction, via the network 102, to one or more nodes 120, as shown at instance 412.

Generally, the one or more nodes 120 comprise a plurality of nodes that communicate via the network 102. In embodiments, the plurality of nodes verify transactions with one another, and only verified transactions are stored to the distributed electronic ledger 122. In some embodiments, the carrier server 104 and/or the non-carrier server 112 can function as nodes that facilitate verification of transactions. The one or more nodes 120 are configured to perform a verification of the transaction, as shown at instance 414 of FIG. 4. After an affirmative verification, the transaction can be further communicated to the distributed electronic ledger 122, as shown at instance 416. Then, the communicated transaction can be stored to the distributed electronic ledger 122, as shown at instance 418. The distributed electronic ledger comprises data, the data being indicative of transactions. Transactions and data for those transactions can be represented as a plurality of "blocks." One or more transactions that are communicated to the plurality of nodes are used to generate a new block once the transactions are verified by a majority of the plurality of nodes, generally. Each new block can be electronically added and linked to prior-in-time blocks in the distributed electronic ledger 122, thus providing a sequential and linked "blockchain" indicative of the transactions for which data can be stored in the distributed electronic ledger 122. Moreover, each block can represent and/or comprise data identifying one or more particular transactions, pre-tender diagnostic information, shipping creation information, item identifiers, non-carrier entity information, end user information, contact information for an end user, carrier services behavior (e.g., type, volume, service level used by entity when acting as a customer of a carrier), item characteristics, delivery information, location identifiers, and/or addresses that are each indicative of a non-carrier entity, a recipient or end user of an item, a carrier entity, and/or location having prior, present, or future control over the end-user computing device 118, in embodiments. In various embodiments, a new block can be generated and added to a blockchain of the distributed electronic ledger 122 upon receipt of information and/or data indicating one or more of: a subsequent transaction, tender of an item to a carrier, static and/or dynamic location information of an item (e.g., progressive parcel tracking using identifier scanning and near real-time location tracking of a parcel through carrier distribution channels and/or via delivery vehicles), delivery of an item to a location, delivery confirmation, or a change in control of the end-user computing device 118 between one or more entities. It is further contemplated that each block can be associated with and/or include a timestamp that can be generated by one or more of the nodes 120 upon receiving the transaction.

In embodiments, the carrier server 104 or the surveillance component 110 thereof monitors the distributed electronic ledger 122, via the network 102. Although not shown in FIG. 4, the surveillance component 110 can communicate one or more requests to the nodes 120 for information regarding additional and/or subsequent transactions and/or blocks that have been added to the distributed electronic ledger 122. These requests can be communicated periodically, in some embodiments. As such, in some embodiments, one or more nodes 120 monitor the distributed electronic ledger 122 and provide a notification to the carrier server 104 of subsequent transactions added to the distributed electronic ledger 122, such that the carrier server 104 can indirectly monitor the distributed electronic ledger 122 by monitoring the one or more nodes 120. The carrier server 104 or the surveillance component 110 thereof can therefore detect when a subsequent transaction is added to the distributed electronic ledger 122, based on the monitoring. In further embodiments, the carrier server 104 or the surveillance component 110 thereof can detect when a subsequent transaction that corresponds to the item identifier is stored to the distributed electronic ledger 122, based on the monitoring.

In some embodiments, the surveillance component 110 can identify, via the network 102 and/or the one or more nodes 120, a subsequent transaction that corresponds to the item identifier. In a further embodiment, the surveillance component 110 can identify the previously stored transaction (i.e., having the pre-tender diagnostic information) on the distributed ledger, based on the detection of the subsequent transaction corresponding to the item identifier. The subsequent transaction can comprise one or more of an item identifier or post-delivery diagnostic information for the end-user computing device 118, in various embodiments. Generally, post-delivery diagnostic information indicates diagnostic test results that report on system performance of the end-user computing device 118, as measured subsequent to delivery of the end-user computing device 118 by the carrier to another controlling entity, such as an end user.

The post-delivery diagnostic information indicates diagnostic test results that report on system performance as measured at any time subsequent to delivery of the end-user computing device 118 by the carrier to another controlling entity, such as an end user. Accordingly, in some embodiments, the post-delivery diagnostic information can indicate system performance as measured by a diagnostic test performed within one day of delivery, within one week of delivery, within one year of delivery, within a predefined period of time that corresponds to a parts or manufacturing warranty, and/or within a predefined period of time that corresponds to a return policy, for example. Additionally or alternatively, post-delivery diagnostic information can indicate system performance as measured by a diagnostic test performed periodically, for example, once a week, twice per week, bi-monthly, monthly, quarterly, semi-annually, annually, and/or another predefined period of time. Therefore, post-delivery diagnostic information can be communicated as a transaction to be added to the distributed electronic ledger 122 each time that post-delivery information is obtained, e.g., once, more than once, or on a reoccurring basis, whether system performance testing is manual or automatic. Further, the non-carrier server 112, the carrier server 104, and/or the surveillance component 110 can monitor the distributed electronic ledger 122 in order to recognize when post diagnostic test results are added to the distributed electronic ledger 122 as one or more transactions, whether added once, more than once, intermittently, and/or periodically, and spanning any amount of time after delivery.

In some embodiments, when the surveillance component 110 detects that a subsequent transaction corresponding to the item identifier is added to the distributed electronic ledger 122, the carrier server 104 can monitor the non-carrier server 112 in anticipation of receipt of a notification from the non-carrier server 112. The carrier server 104 can monitor the non-carrier server 112 in anticipation of receipt of such notification for a predefined period of time, wherein upon lapse or expiration of the predefined period of time, the carrier server 104 terminates monitoring the non-carrier server 112, in an embodiment. The surveillance component 110 can continue to monitor the distributed electronic ledger 122 while the carrier server 104 simultaneously monitors the non-carrier server 112, in one embodiment.

Additionally or alternatively, the non-carrier server 112 can monitor the distributed electronic ledger 122, via the network 102. The non-carrier server 112 can detect when a subsequent transaction is added to the distributed electronic ledger 122, in some embodiments. In further embodiments, the non-carrier server 112 can detect when a subsequent transaction that corresponds to the item identifier is stored to the distributed electronic ledger 122. The subsequent transaction can comprise a delivery information and/or a notification of delivery for the end-user computing device 118, in one embodiment.

Continuing with FIG. 4, post-delivery diagnostic information for the end-user computing device 118 can be stored to the distributed electronic ledger 122 in a "block" that comprises one or more transactions, in some embodiments. For example, subsequent to delivery, the end-user computing device 118 can be powered "on." In one embodiment, in response to being powered "on," the diagnostic tool operating at the end-user computing device 118 can be initiated, and one or more diagnostic tests can be performed, via one or more processors of the end-user computing device 118, as shown at instance 420. Alternatively, the diagnostic tool can be initiated in response to user input, via the end-user computing device 118, wherein the user input indicates performance of the one or more diagnostic tests is desired. Output of the one or more diagnostic tests can be recorded, regarding the functions and operations of software, hardware, or a combination thereof, of the end-user computing device 118 subsequent to delivery to the end user, in embodiments. This output can comprise post-delivery diagnostic information of the end-user computing device 118. Generally, the output of the one or more diagnostic tests that are performed at the end-user computing device 118 subsequent to delivery of the end-user computing device 118 from a carrier entity to an end user, can be an output that comprises post-delivery diagnostic information that is specific to the end-user computing device 118. In embodiments, the output of the diagnostic tool can be communicated from the end-user computing device 118 to the non-carrier server 112, as shown in instance 422. Additionally or alternatively, the output can be communicated to the one or more nodes 120 as a new transaction, for verification and storage to the distributed electronic ledger 122. The output can comprise a unique item identifier, as previously discussed regarding the pre-tender diagnostic information. In embodiments, the diagnostics tests are performed at the first instance of the end-user computing device 118 being powered up after delivery. As such, the operation of the end-user computing device 118 is assessed at the initial post-delivery power-up, prior to any subsequent end-user handling, use, misuse, software installations, and/or tampering of the end-user computing device 118. However, in some embodiments, the operation of the end-user computing device 118 is assessed by diagnostic testing one or more times after the initial post-delivery power-up, and/or after end-user handling has occurred, as mentioned above.

In one embodiment, the diagnostic assessment component 114 of the non-carrier server 112 receives output from the one or more diagnostic tests performed subsequent to delivery, as communicated from the end-user computing device 118. The output can comprise the post-delivery diagnosis information, and the output and/or the post-delivery diagnostic information can be associated with the item identifier, in some embodiments. As such, the non-carrier server 112 can use the item identifier to perform operations as further discussed herein.

In one embodiment, the diagnostic assessment component 114 receives raw data as output from the one or more diagnostic tests performed subsequent to delivery, as communicated from the end-user computing device 118. In such an embodiment, the diagnostic assessment component 114 can generate post-delivery diagnostic information regarding the software and hardware operations and system performance of the end-user computing device 118, using the raw data and the item identifier. The non-carrier server 112 or the diagnostic assessment component 114 thereof can also retrieve the pre-tender diagnostic information from the distributed electronic ledger 122, via the network 102, in one embodiment. The item identifier can be used to locate and/or retrieve the pre-tender diagnostic information. For example, the stored transaction including the shipment creation information on the distributed electronic ledger 122 can be identified based on the detection of the subsequent transaction, by the non-carrier server 112, by the carrier server 104, and/or by the one or more nodes 120, in various embodiments. Additionally or alternatively, the non-carrier server 112 or the diagnostic assessment component 114 thereof can retrieve the pre-tender diagnostic information from memory of the non-carrier server 112, in one embodiment.

Accordingly, subsequent to receiving the output comprising the post-delivery diagnostic information and the item identifier, the non-carrier server 112 or the diagnostic assessment component 114 thereof can use the pre-tender diagnostic information for the end-user computing device 118 and the post-delivery diagnostic information for the end-user computing device 118 to determine whether the end-user computing device 118 is operational, non-operational, and/or operating within predetermined diagnostic thresholds and/or baselines (e.g. "normal" operations) after delivery. The non-carrier server 112 or the diagnostic assessment component 114 thereof can determine whether the post-delivery diagnostic information matches the pre-tender diagnostic information stored to the distributed electronic ledger 122. The non-carrier server 112 or the diagnostic assessment component 114 thereof can determine that the post-delivery diagnostic information is an identical match to the pre-tender diagnostic information, in one embodiment. In one such an embodiment, the non-carrier server 112 or the diagnostic assessment component 114 thereof can further determine that the non-identical post-delivery diagnostic information is equivalent to a match to the pre-tender diagnostic information when values of the post-delivery diagnostic information are within a predetermined range of values of the pre-tender diagnostic information. In yet another embodiment, the non-carrier server 112 or the diagnostic assessment component 114 thereof can determine that the non-identical post-delivery diagnostic information is equivalent to a match to the pre-tender diagnostic information when values of the post-delivery diagnostic information meet or exceed one or more predefined thresholds for diagnostic information.

When it is determined that the post-delivery diagnostic information matches the pre-tender diagnostic information, the notification component 116 of the non-carrier server 112 automatically generates a notification indicating that the post-delivery diagnostic information matches the pre-tender diagnostic information, shown at instance. The non-carrier server 112 can communicate the notification to the carrier server 104. In one such embodiment, communication component 106 of the carrier server 104 receives the notification from the non-carrier server 112, the notification indicating the determination that the post-delivery diagnostic information for the end-user computing device 118 matches the pre-tender diagnostic information for the end-user computing device 118. Then, the carrier server 104 can determine that an electronic remediation action is not to be generated based on the notification received indicating the determination that the post-delivery diagnostic information for the end-user computing device 118 matches the pre-tender diagnostic information for the end-user computing device 118, in such an embodiment.

When it is determined that the post-delivery diagnostic information does not match the pre-tender diagnostic information, or is not equivalent to a match to the pre-tender diagnostic information, the notification component 116 of the non-carrier server 112 automatically generates a notification, shown at instance 424 of FIG. 4. The notification indicates the determination that the post-delivery diagnostic information does not match, or is not equivalent to, a match for the pre-tender diagnostic information, in an embodiment. In some embodiments, the notification comprises the item identifier. The notification can comprise contact information, in some embodiments. Non-limiting examples of contact information can include a physical mailing address of an end user that is associated with the end-user computing device 118, a telephone number of an end user that is associated with the end-user computing device 118, an email address of an end user that is associated with the end-user computing device 118, or any identifier for the end user, for a computing device associated with the end user, and/or for a physical delivery destination associated with the end-user computing device 118 and/or the end user. The notification can be communicated from the non-carrier server 112 to the carrier server 104, as shown at instance 426 of FIG. 4.

In embodiments, the communication component 106 of the carrier server 104 is configured to receive the notification from the non-carrier server 112, wherein the notification indicates the determination that the post-delivery diagnostic information for the end-user computing device 118 is different than the pre-tender diagnostic information for the end-user computing device 118. In some embodiments, the notification can comprise the item identifier associated with the end-user computing device 118 for which the post-delivery diagnostic information does not match the pre-tender diagnostic information. Additionally or alternatively, the notification can comprise contact information, as described above.

Based on the notification, the remediation component 111 of the carrier server 104 can generate an electronic remediation action, as shown at instance 428 of FIG. 4. In an embodiment, the generation of the electronic remediation action can be based on the determination that the post-delivery diagnostic information, as included in the detected subsequent transaction, is different than the pre-tender diagnostic information included in the stored transaction. In one embodiment, the electronic remediation action is automatically generated based further on another determination that the post-delivery diagnostic information corresponds to one or more predefined diagnostic baseline criteria. In one embodiment, the electronic remediation action can be automatically generated by the remediation component 111 based on the determination that the post-delivery diagnostic information included in the detected subsequent transaction is different than the pre-tender diagnostic information included in the stored transaction, or based on the determination that the post-delivery diagnostic information corresponds to one or more predefined diagnostic baseline criteria.

In another example, the non-carrier server 112 and/or the carrier server 104 can communicate 427A and 427B with the distributed electronic ledger 122 for initiating the generation of electronic remediation action. In on such an example, the electronic remediation action can be generated by the remediation component 111 of the carrier server 104 based on the determination that the post-delivery diagnostic information in the distributed electronic ledger 122 is different than the pre-tender diagnostic information distributed electronic ledger 122, or based on the determination that the post-delivery diagnostic information corresponds to one or more predefined diagnostic baseline criteria.

In some embodiments, the electronic remediation action that is generated is an action that is specific to the determination that the post-delivery diagnostic information included in the detected subsequent transaction is different than the pre-tender diagnostic information included in the stored transaction. In an embodiment, the electronic remediation action can be automatically generated by the remediation component 111 based further on another determination that the post-delivery diagnostic information corresponds to one or more predefined diagnostic baseline criteria. The determination that the post-delivery diagnostic information corresponds to one or more predefined diagnostic baseline criteria can be included, for example, in the notification received from the non-carrier server 112, in some embodiments. In embodiments, the determination that the post-delivery diagnostic information corresponds to one or more predefined diagnostic baseline criteria is based on the post-delivery diagnostic information, the notification received from the non-carrier server 112, and/or information located in the distributed electronic ledger 122, that indicates that the end-user computing device 118 is not operating within predetermined diagnostic thresholds and/or baselines (e.g. "normal" operations) after delivery.

In further embodiments, the electronic remediation action includes generating a return shipping label for the end-user computing device 118 for communication to one or more of the non-carrier server or a computing device of a recipient of the end-user computing device 118. For example, in an embodiment wherein the notification received from the non-carrier server includes contact information, the electronic remediation action can include using the contact information to generate a return shipping label for the end-user computing device 118. As shown in instance 430 of FIG. 4, the generated shipping label can be communicated to the non-carrier server 112. Thereafter, the non-carrier server 112 can communicate the generated shipping label to the appropriate party, such as the end-user, for return of the end-user computing device 118. The shipping label can comprise a data file having machine-readable and/or human-readable shipping information that is printable and can be affixed, as printed, to a package.

Additionally or alternatively, the electronic remediation action can includes generating a product warranty claim for the end-user computing device 118. For example, in an embodiment wherein the notification received from the non-carrier server includes product warranty information, the electronic remediation action can include using the product warranty information to generate a product warranty claim for the end-user computing device 118.

In some embodiments, the transaction component 108 of the carrier server 104 can generate a further transaction, subsequent to receipt of the notification. The further transaction can comprise the generated electronic remediation action, embodiments. In such an embodiment, the communication component 106 can communicate the generated further transaction to the network 102 for storage to the distributed electronic ledger 122, as facilitated by the one or more nodes 120.

In further embodiments, instance 420 through instance 430 of FIG. 4 can be repeated each time that post-delivery diagnostic information is generated after delivery, at any time after delivery, and for any number of occurrences system. As mentioned, in some embodiments, the post-delivery diagnostic information can indicate system performance as measured by a diagnostic test that can be performed at any time after delivery. Additionally, post-delivery diagnostic information can be generated more than once and the post-delivery diagnostic information can be communicated, each time, for comparison with the pre-tender diagnostic information and/or with a previously-recorded post-delivery diagnostic information stored in the distributed electronic ledger as one or more transactions. For example, updated post-delivery diagnostic information can be generated periodically when the system performance of the end-user computing device 118 is periodically tested. Each time a diagnostic system check or test is performed on the end-user computing device 118, the results can be communicated to the distributed electronic ledger as a transaction, the transaction including the updated post-delivery diagnostic information. The updated post-delivery diagnostic information can then be compared with the pre-tender diagnostic information and/or with previously recorded post-delivery diagnostic information stored in the distributed electronic ledger.

In such embodiments, the system performance of the end-user computing device 118 can be diagnostically tested on command and/or diagnostically tested automatically via pre-scheduled time markers programmed into the end-user computing device 118. In some embodiments, updated post-delivery diagnostic information can be generated more than once and/or periodically within a predefined period of time, where the period of time corresponds to a parts warranty and/or a manufacturing warranty that corresponds to the end-user computing device 118 and/or a service plan for the end-user computing device 118. Each time the updated post-delivery diagnostic information is generated, it can be communicated and compared, as previously discussed with regard to instance 420 through instance 430 of FIG. 4. The updated post-delivery diagnostic information can be generated more than once and/or periodically within a predefined period of time, in some embodiments, where the period of time corresponds to a return policy for the end-user computing device 118.

In such embodiments as discussed above, updated post-delivery diagnostic information can be generated and communicated for comparison with the pre-tender diagnostic information and/or with previously recorded post-delivery diagnostic information stored in the distributed electronic ledger 122, for example, once a week, twice per week, bi-monthly, monthly, quarterly, semi-annually, annually, and/or another predefined period of time. Therefore, post-delivery diagnostic information can be communicated to the distributed electronic ledger 122 on a reoccurring basis, for example, until the expiration of a warranty or the expiration of a predefined time period. In an embodiment, the post-delivery diagnostic information and/or updated post-delivery diagnostic information is added as one or more transactions to the distributed electronic ledger 122. In embodiments, updated post-delivery diagnostic information can be generated from diagnostic testing and compared with the pre-tender diagnostic information and/or with other previously recorded post-delivery diagnostic information stored in the distributed electronic ledger 122. Accordingly, in various embodiments, the non-carrier server 112 or the diagnostic assessment component 114 thereof use the pre-tender diagnostic information for the end-user computing device 118 and post-delivery diagnostic information, garnered at any time after delivery for the end-user computing device 118, to determine whether the end-user computing device 118 is operational, non-operational, and/or operating within predetermined diagnostic thresholds and/or baselines (e.g. "normal" operations), one or more of the previously-described electronic remediation actions can be initiated and/or performed. Even after the end-user computing device 118 is physically transferred to a second end-user (e.g., by gift or sale), instances 420 through instance 430 of FIG. 4 can be repeated one or more times, to generated updated post-delivery diagnostic information, for example. Accordingly, warranties can travel or transfer with the end-user computing device 118 for the duration of those warranties, in one example. In further embodiments, the transfer of the user computing device 118 is communication as a transaction that is stored in the distributed electronic ledger 122, for example, for recording transfer of a warranty associated with the end-user computing device 118. Additionally or alternatively, one or more notices of a warranty expiration can be stored to the distributed electronic ledger 122, as sent from the end-user computing device 122 and/or the non-carrier server 112, for example.

Regarding FIGS. 1 through 4, it will be understood by those of ordinary skill in the art that the computing environment 100 and components are not intended to limit the scope of use or functionality of the present invention. Similarly, the computing environment 100 and components should not be interpreted as imputing any dependency and/or any requirements with regard to each component and combination(s) of components illustrated therein. It will be appreciated by those having ordinary skill in the art that the connections illustrated in FIG. 1 are contemplated to potentially include methods, hardware, software, and/or other devices for establishing a communications link between the components, devices, systems, and/or entities, as can be utilized in implementation of the present invention. Although the connections are depicted using one or more solid lines in FIGS. 1 through 4, it will be understood by those having ordinary skill in the art that the connections can be hardwired or wireless, and can use intermediary components that have been omitted or are not included in the FIGS. 1 through 4 for simplicity. As such, the absence of components from FIGS. 1 through 4 should be not be interpreted as limiting the present invention to exclude additional component(s) and/or combination(s) of components. Moreover, though devices and components in FIGS. 1 through 4 are represented as singular devices and/or components, it will be appreciated that some embodiments can include a plurality of devices and/or components such that FIGS. 1 through 4 should not be considered as limiting the number of a devices and/or components.

Figure 5:
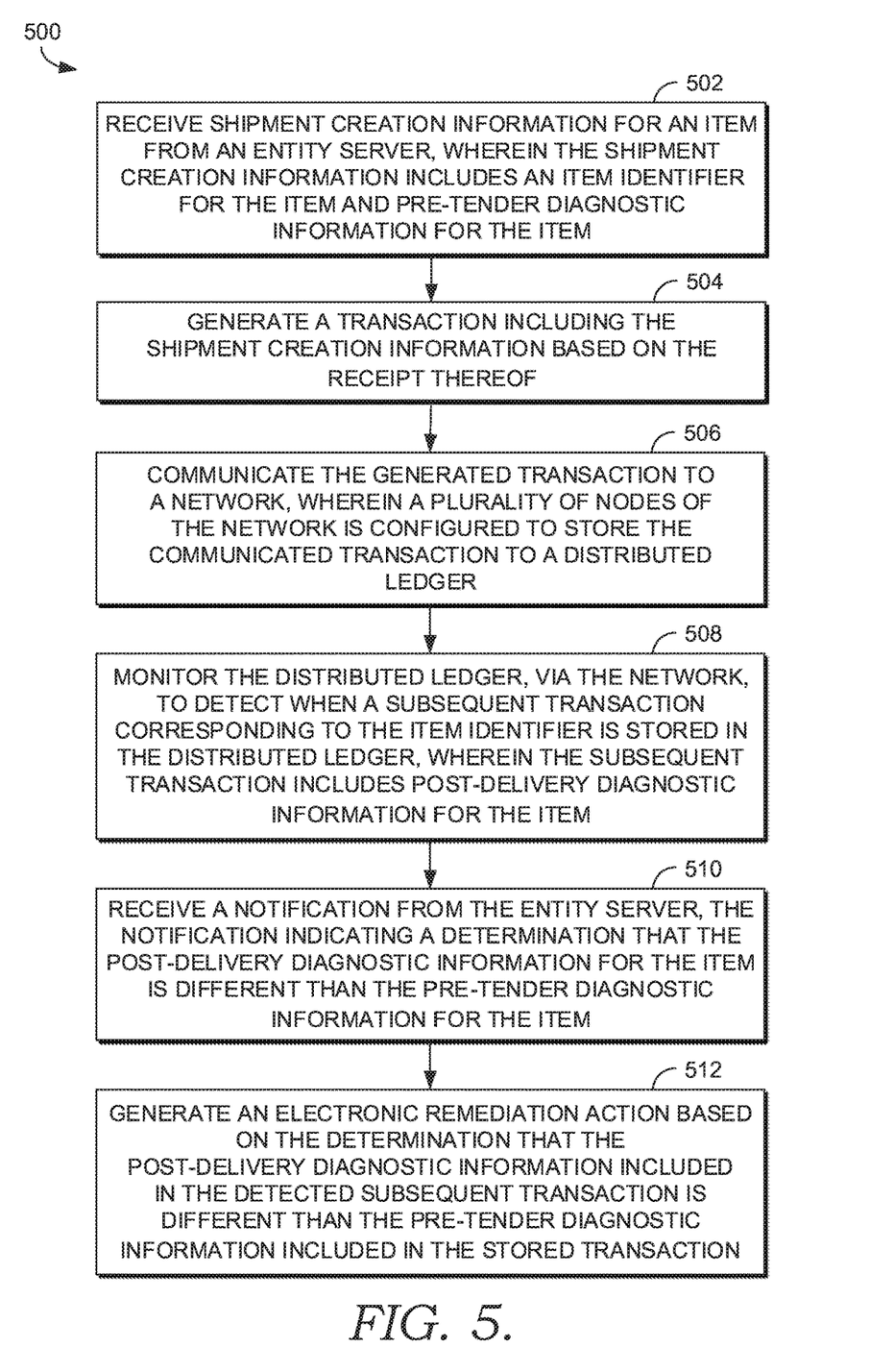
FIG. 5 illustrates a method in accordance with an embodiment of the present invention.
Figure 6:
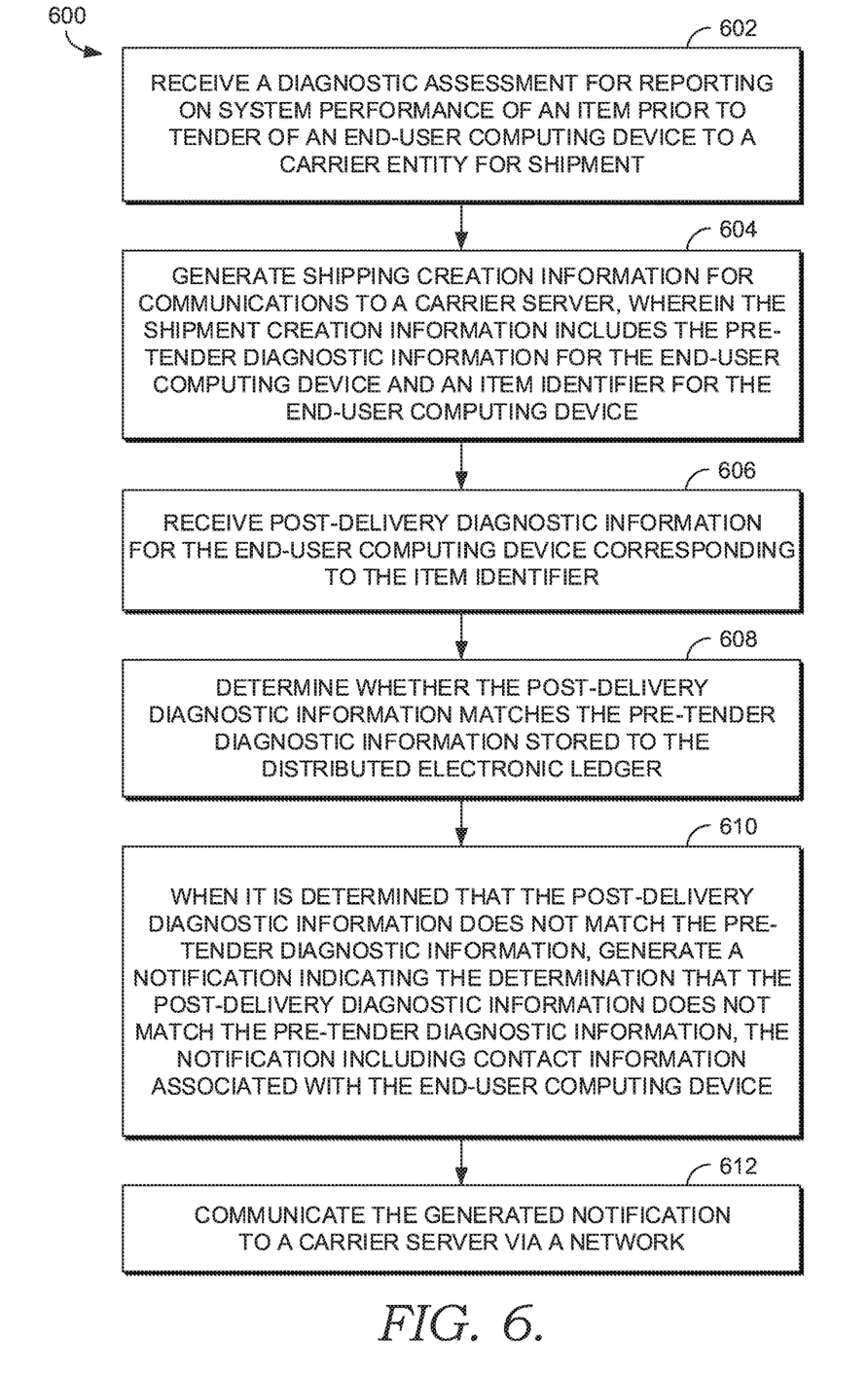
FIG. 6 illustrates another method in accordance with an embodiment of the present invention.

Turning now to FIGS. 5 and 6, methods are discussed that can be performed via one or more of the components and component interactions previously described in FIGS. 1 through 4. As such, the methods are discussed briefly for brevity, though it will be understood that the previous discussion and details described therein can be applicable to aspect of the methods of FIGS. 5 and 6. Additionally or alternatively, it will be understood that the methods discussed herein can be implemented or performed via the execution of computer-readable instructions stored on computer readable media, by one or more processors.

FIG. 5 illustrates a method 500 in accordance with an embodiment of the present invention. The method 500 can be performed via a computing device, in embodiments. The computing device can include a communication component, such as communication component 106 of FIG. 2, which can receive shipment creation information for an item from an entity server. At block 502, the communication component can receive shipment creation information for an item from a non-carrier server, wherein the shipment creation information includes an item identifier for the end-user computing device 118 and pre-tender diagnostic information for the end-user computing device 118. The computing device can include a transaction component, such as transaction component 108 of FIG. 2, which can generate a transaction including the shipment creation information based on the receipt thereof. At block 504, the transaction component can generate a transaction including the shipment creation information based on the receipt thereof. The communication component can then communicate the generated transaction to a network, wherein a plurality of nodes of the network is configured to store the communicated transaction to a distributed ledger, as illustrated in block 506.

In some embodiments, the computing device can also include a surveillance component, such as surveillance component 110 of FIG. 2, which can monitor the distributed ledger. At block 508, the surveillance component can indirectly (e.g., via one or more nodes) or directly monitor the distributed ledger, using the network, to detect when a subsequent transaction corresponding to the item identifier is stored in the distributed ledger, wherein the subsequent transaction includes post-delivery diagnostic information for the end-user computing device 118. Additionally or alternatively, the non-carrier server, such as non-carrier server 112 of FIG. 3, can indirectly (e.g., via one or more nodes) or directly monitor the distributed ledger, using the network, to detect when a subsequent transaction corresponding to the item identifier is stored in the distributed ledger, wherein the subsequent transaction includes post-delivery diagnostic information for the end-user computing device 118. Continuing, the communication component can receive a notification from the non-carrier server, the notification indicating a determination that the post-delivery diagnostic information for the end-user computing device 118 is different than the pre-tender diagnostic information for the end-user computing device 118, as depicted at block 510. In some embodiments, the computing device can further include a remediation component, such as remediation component 111 of FIG. 2, which can generate an electronic remediation action. At block 512, the remediation component generates an electronic remediation action based on the determination that the post-delivery diagnostic information included in the detected subsequent transaction is different than the pre-tender diagnostic information included in the stored transaction.

FIG. 6 illustrates a method 600 in accordance with an embodiment of the present invention. The method 600 can be performed via a computing device, in some embodiments. The computing device can include a diagnostic assessment component, such as diagnostic assessment component 114 of FIG. 3, which can receive communications and make diagnostic determinations. At block 602, the diagnostic assessment component can receive a diagnostic assessment for reporting on system performance of an item prior to tender of the end-user computing device 118 to a carrier entity for shipment. In some embodiments, the diagnostic assessment component can generate pre-tender diagnostic information for the end-user computing device 118 based on the received diagnostic assessment.

At block 604, the diagnostic assessment component can generate shipping creation information for communications to a carrier server, wherein the shipment creation information can include the pre-tender diagnostic information for the end-user computing device 118 and an item identifier for the end-user computing device 118. The computing device can subsequently receive post-delivery diagnostic information for the end-user computing device 118 corresponding to the item identifier, as illustrated at block 606. At block 608, the diagnostic assessment component can determine whether the post-delivery diagnostic information matches the pre-tender diagnostic information stored to the distributed electronic ledger. In further embodiments, the computing device can retrieve the shipping creation information, stored locally or remotely, for the purposes of the determination.

The computing device can also include a notification component, such as notification component 116 of FIG. 3, which can generate notifications. At block 610, when the diagnostic assessment component determines that the post-delivery diagnostic information does not match the pre-tender diagnostic information, the notification component generates a notification indicating the determination that the post-delivery diagnostic information does not match the pre-tender diagnostic information, the notification including contact information associated with the end-user computing device 118. In further embodiments, the computing device can retrieve the contact information, stored locally or remotely, for the purposes of generating the notification of said determination. In further embodiments, the notification further includes a request for a remediation action. At block 612, the computing device can communicate the generated notification to a carrier server, via a network. The carrier server can initiate one or more remediation actions in response to receipt of the generated notification and/or based on the determinations indicated by the notification. In some embodiments, the computing device receives a shipping label generated by the carrier server, wherein the shipping label corresponds to the item identifier of the end-user computing device 118 and the shipping label corresponds to the contact information included in the notification generated by the notification component.

It is noted that embodiments of the present invention described herein with reference to block diagrams and flowchart illustrations, such as those illustrated in FIGS. 4, 5 and 6. However, it should be understood that each block of the block diagrams and/or flowchart illustrations can be implemented in the form of a computer program product, an entirely hardware embodiment, a combination of hardware and computer program products, and/or apparatus, systems, computing devices/entities, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code can be performed sequentially such that one instruction is retrieved, loaded, and executed at a time. In some embodiments, retrieval, loading, and/or execution can be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Additionally, as should be appreciated, various embodiments of the present disclosure described herein can also be implemented as methods, apparatus, systems, computing devices/entities, computing entities, and/or the like. As such, embodiments of the present disclosure can take the form of an apparatus, system, computing device, computing entity, and/or the like executing instructions stored on a computer-readable storage medium to perform certain steps or operations. However, embodiments of the present disclosure can also take the form of an entirely hardware embodiment performing certain steps or operations.

Figure 7:
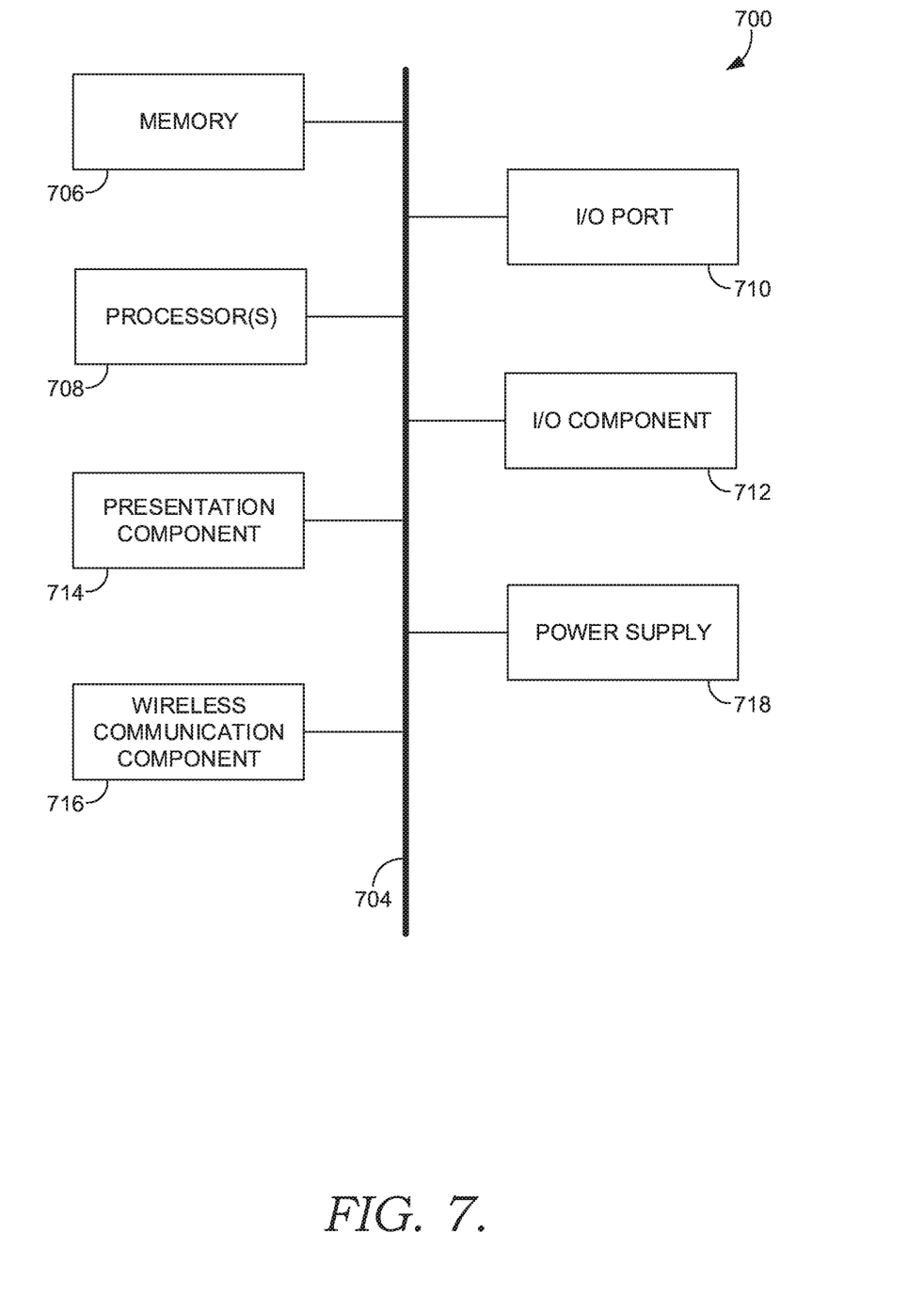
FIG. 7 illustrates a computing device in accordance with an embodiment of the present disclosure.

Turning to FIG. 7, it depicts a block diagram of a computing device 700 suitable to implement embodiments of the present invention. It will be understood by those of ordinary skill in the art that the computing device 700 is just one non-limiting example of a suitable computing device and is not intended to limit the scope of use or functionality of the present invention. Similarly, the computing device 700 should not be interpreted as imputing any dependency and/or any requirements with regard to each component and combination(s) of components illustrated in FIG. 7. It will be appreciated by those having ordinary skill in the art that the connections illustrated in FIG. 7 may comprise other methods, hardware, software, and/or devices for establishing a communications link between the components, devices, systems, and entities. Although the connections are depicted using one or more solid lines, it will be understood by those having ordinary skill in the art that the connections of FIG. 7 can be hardwired or wireless, and can use intermediary components that have been omitted or not included in FIG. 7 for simplicity's sake. As such, the absence of components from FIG. 7 should be not be interpreted as limiting the present invention to exclude additional components and combination(s) of components. Moreover, though devices and components are represented in FIG. 7 as singular devices and components, it will be appreciated that some embodiments can include a plurality of the devices and components such that FIG. 7 should not be considered as limiting the number of a devices or components.

Continuing, the computing device 700 can be in the form of a server, in some embodiments. Although illustrated as one component in FIG. 7, the present invention can utilize a plurality of local servers and/or remote servers in the computing device 700. The server can include components such as a processing unit, internal system memory, and a suitable system bus for coupling to various components, including a database or database cluster. The system bus can be any of several types of bus structures, including a memory bus or memory controller, a peripheral bus, and a local bus, using any of a variety of bus architectures. By way of example, and not limitation, such architectures include Industry Standard Architecture (ISA) bus, Micro Channel Architecture (MCA) bus, Enhanced ISA (EISA) bus, Video Electronic Standards Association (VESA) local bus, and Peripheral Component Interconnect (PCI) bus, also known as Mezzanine bus.

The server can include or can have access to computer-readable media. Computer-readable media can be any available media that can be accessed by server. Computer-readable media can include one or more of volatile media, nonvolatile media, removable media, or non-removable media. By way of a non-limiting example, computer-readable media can include computer storage media and/or communication media. Non-limiting examples of computer storage media can include one or more of volatile media, nonvolatile media, removable media, or non-removable media, can be implemented in any method and/or any technology for storage of information, such as computer-readable instructions, data structures, program modules, or other data. In this regard, non-limiting examples of computer storage media can include Random Access Memory (RAM), Read-Only Memory (ROM), Electrically Erasable Programmable Read-Only Memory (EEPROM), flash memory or other memory technology, CD-ROM, digital versatile disks (DVDs) or other optical disk storage, magnetic cassettes, magnetic tape, magnetic disk storage, or other magnetic storage device, or any other medium which can be used to store information and which can be accessed by the server. Generally, computer storage media is non-transitory such that it does not comprise a signal per se.

Communication media can embody computer-readable instructions, data structures, program modules, and/or other data in a modulated data signal, such as a carrier wave or other transport mechanism. Communication media can include any information delivery media. As used herein, the term "modulated data signal" refers to a signal that has one or more of its attributes set or changed in such a manner as to encode information in the signal. Non-limiting examples of communication media can include wired media, such as a wired network connection, a direct-wired connection, and/or a wireless media, such as acoustic, radio frequency (RF), infrared, and other wireless media. Combinations of any of the above also can be included within the scope of computer-readable media.

Continuing with FIG. 7, the a block diagram of a computing device 700 suitable for providing packing instructions is provided, in accordance with an embodiment of the technology. It should be noted that although some components depicted in FIG. 7 are shown in the singular, they can be plural, and the components can be connected in a different, including distributed, configuration. For example, computing device 700 can include multiple processors and/or multiple radios. As shown in FIG. 7, computing device 700 includes a bus 704 that can directly or indirectly connect different components together, including memory 706 and a processor 708. In further embodiments, the computing device 700 can include one or more of an input/output (I/O) port 710, I/O component 712, presentation component 714, or wireless communication component 716, such as a radio transceiver. The computing device 700 can be coupled to a power supply 718, in some embodiments.

Memory 706 can take the form of the memory components described herein. Thus, further elaboration will not be provided here, but it should be noted that memory 706 can include any type of tangible medium that is capable of storing information, such as a database. A database can include any collection of records, data, and/or other information. In one embodiment, memory 706 can include a set of computer-executable instructions that, when executed, facilitate various functions or steps disclosed herein. These instructions will variously be referred to as "instructions" or an "application" for short. Processor 708 can actually be multiple processors that can receive instructions and process them accordingly. Presentation component 714 can include a display, a speaker, a screen, a portable digital device, and/or other components that can present information through visual (e.g., a display, a screen, a lamp, a light-emitting diode (LED), a graphical user interface (GUI), and/or even a lighted keyboard), auditory (e.g., a speaker), haptic feedback, and/or other tactile cues. Wireless communication component 716 can facilitate communication with a network as previously described herein. Additionally or alternatively, the wireless communication component 716 can facilitate other types of wireless communications, such as Wi-Fi, WiMAX, LTE, Bluetooth, and/or other VoIP communications. In various embodiments, the wireless communication component 716 can be configured to concurrently support multiple technologies.

I/O port 710 can take a variety of forms. Exemplary I/O ports can include a USB jack, a stereo jack, an infrared port, a firewire port, and/or other proprietary communications ports. I/O component 712 can comprise one or more keyboards, microphones, speakers, touchscreens, and/or any other item useable to directly or indirectly input data into the computing device 700. Power supply 718 can include batteries, fuel cells, and/or any other component that can act as a power source to supply power to computing device 700 or to other components.

Although internal components of the computing device 700 are not illustrated for simplicity, those of ordinary skill in the art will appreciate that internal components and their interconnection are present in the computing device 700 of FIG. 7. Accordingly, additional details concerning the internal construction of the computing device 700 are not further disclosed herein.

Any and all of the embodiments discussed hereinabove may further be used alone or in combination with those embodiments discussed in U.S. Pat. No. 10,182,305 B2, filed on Nov. 16, 2015 and having issued on Jan. 15, 2019, which is incorporated by reference herein in its entirety.

Many modifications and other embodiments of the inventions set forth herein will come to mind to one skilled in the art to which these inventions pertain having the benefit of the teachings presented in the foregoing description and the associated drawings. Therefore, it is to be understood that the inventions are not to be limited to the specific embodiments disclosed and that modifications and other embodiments are intended to be included within the scope of the appended claims. Although specific terms are employed herein, they are used in a descriptive sense only and not for purposes of limitation, unless described otherwise.

What is claimed is:

1. One or more non-transitory computer-readable media having computer instructions stored thereon for execution by one or more processors, wherein execution of the computer instructions via the one or more processors results in a method, the method comprising:
    receiving shipment creation information for an end-user computing device from an entity server, wherein the shipment creation information includes an item identifier for the end-user computing device and pre-tender diagnostic information for the end-user computing device, wherein the pre-tender diagnostic information includes one or more indicators that the end-user computing device is operating within one or more predetermined thresholds for software and hardware functionalities;
    generating a transaction including the shipment creation information based on the receipt thereof;
    communicating the generated transaction to a network, wherein a plurality of nodes of the network is configured to store the communicated transaction to a blockchain;
    monitoring the blockchain, via the network, to detect when a subsequent transaction corresponding to the item identifier is stored in the blockchain, wherein the subsequent transaction includes post-delivery diagnostic information for the end-user computing device, and the post-delivery diagnostic information includes one or more indicators that the end-user computing device is not operating within at least one of the one or more predetermined thresholds for the software and hardware functionalities, as determined by a diagnostic application program installed on the end-user computing device;
    receiving a notification from the entity server, the notification indicating a determination that the post-delivery diagnostic information for the end-user computing device is different than the pre-tender diagnostic information for the end-user computing device, wherein the post-delivery diagnostic information is automatically captured by the diagnostic application program installed on the end-user computing device and quantifies the software and hardware functionalities of the end-user computing device; and
    automatically generating an electronic remediation action in response to the notification indicating the determination that the post-delivery diagnostic information included in the detected subsequent transaction is different than the pre-tender diagnostic information included in the stored transaction.

2. The method of claim 1, further comprising:
    generating a further transaction, the further transaction comprising the generated electronic remediation action; and
    communicating the generated further transaction to the network for storage to the blockchain by the plurality of nodes.

3. The method of claim 1, wherein the stored subsequent transaction further includes the item identifier and the post-delivery diagnostic information.

4. The method of claim 1, further comprising:
    identifying, via the network, the stored transaction on the blockchain based on the detection of the subsequent transaction.

5. The method of claim 1, wherein the electronic remediation action is generated based further on another determination that the post-delivery diagnostic information corresponds to one or more predefined diagnostic baseline criteria.

6. The method of claim 1, wherein the electronic remediation action is generated based on the notification indicating the determination that the post-delivery diagnostic information for the end-user computing device is different than the pre-tender diagnostic information for the end-user computing device.

7. The method of claim 1, wherein the pre-tender diagnostic information reports on system performance by quantifying the software and hardware functionalities of the end-user computing device.

8. The method of claim 1, wherein the electronic remediation action is one or more of generating a return shipping label for the end-user computing device for communication to one or more of the entity server or a computing device of a recipient of the end-user computing device, or generating a product warranty claim for the end-user computing device.

9. The method of claim 1, wherein the notification received from the entity server includes contact information, and wherein the electronic remediation action includes using the contact information to generate a return shipping label for the end-user computing device.

10. One or more non-transitory computer-readable media having computer instructions stored thereon for execution by one or more processors, wherein execution of the computer instructions via the one or more processors results in a method, the method comprising:
    receiving shipment creation information for an end-user computing device from an entity server, wherein the shipment creation information includes an item identifier for the end-user computing device and pre-tender diagnostic information for the end-user computing device, wherein the pre-tender diagnostic information includes one or more indicators that the end-user computing device is operating within one or more predetermined thresholds for software and hardware functionalities;
    generating a transaction including the shipment creation information based on the receipt thereof;
    communicating the generated transaction to a network, wherein a plurality of nodes of the network is configured to store the communicated transaction that includes the pre-tender diagnostic information as a new block in a blockchain;
    monitoring the blockchain, via the network, to detect when a subsequent transaction corresponding to the item identifier is stored as another new block in the blockchain, wherein the other new block for the subsequent transaction stores post-delivery diagnostic information for the end-user computing device, and the post-delivery diagnostic information includes one or more indicators that the end-user computing device is operating within the one or more predetermined thresholds for the software and hardware functionalities, as determined by a diagnostic application program installed on the end-user computing device;

receiving a notification from the entity server, the notification indicating a determination that the post-delivery diagnostic information for the end-user computing device stored in the other new block matches the pre-tender diagnostic information stored in the new block for the end-user computing device, wherein the post-delivery diagnostic information is automatically captured by the diagnostic application program installed on the end-user computing device and quantifies the software and hardware functionalities of the end-user computing device; and automatically determining that an electronic remediation action is not to be generated in response to the notification received indicating the determination that the post-delivery diagnostic information for the end-user computing device matches the pre-tender diagnostic information for the end-user computing device.

11. A system comprising:

one or more processors for:

receiving shipment creation information for an end-user computing device from an entity server, wherein the shipment creation information includes an item identifier for the end-user computing device and pre-tender diagnostic information for the end-user computing device, wherein the pre-tender diagnostic information includes one or more indicators that the end-user computing device is operating within one or more predetermined thresholds for software and hardware functionalities;

communicating a generated transaction to a distributed network, wherein a plurality of nodes of the distributed network is configured to store the communicated transaction to a blockchain;

receiving a notification from the entity server, the notification indicating a determination post-delivery diagnostic information for the end-user computing device is different than the pre-tender diagnostic information for the end-user computing device, wherein the post-delivery diagnostic information is automatically captured by a diagnostic application program installed on the end-user computing device and quantifies the software and hardware functionalities of the end-user computing device;

generating the transaction including the shipment creation information based on the receipt thereof of the notification from the entity server of the determination;

monitoring the blockchain, via the distributed network, to detect when a subsequent transaction corresponding to the item identifier is stored in the blockchain, wherein the subsequent transaction includes post-delivery diagnostic information for the end-user computing device, and the post-delivery diagnostic information includes one or more indicators that the end-user computing device is not operating within at least one of the one or more predetermined thresholds for the software and hardware functionalities, as determined by the diagnostic application program installed on the end-user computing device; and automatically generating an electronic remediation action in response to the subsequent transaction that includes the determination that the post-delivery diagnostic information is different than the pre-tender diagnostic information included in the stored transaction.

12. The system of claim 11, wherein the one or more processors are further configured for generating a further transaction, the further transaction comprising the generated electronic remediation action and communicating the generated further transaction to the distributed network for storage to the blockchain.

13. The system of claim 11, wherein the stored subsequent transaction further includes the item identifier and the post-delivery diagnostic information.

14. The system of claim 11, wherein the one or more processors are further configured for identifying, via the distributed network, the stored transaction on the blockchain based on the detection of the subsequent transaction.

15. The system of claim 11, wherein the electronic remediation action is automatically generated based further on another determination that the post-delivery diagnostic information corresponds to one or more predefined diagnostic baseline criteria.

16. The system of claim 11, wherein the electronic remediation action is automatically generated based on the notification indicating the determination that the post-delivery diagnostic information for the end-user computing device is different than the pre-tender diagnostic information for the end-user computing device.

17. The system of claim 11, wherein the pre-tender diagnostic information reports on system performance by quantifying the software and hardware functionalities of the end-user computing device.

18. The system of claim 11, wherein the electronic remediation action is one or more of generating a return shipping label for the end-user computing device for communication to one or more of the entity server or a computing device of a recipient of the end-user computing device or generating a product warranty claim for the end-user computing device.

19. The system of claim 11, wherein the notification received from the entity server includes contact information and wherein the electronic remediation action includes using the contact information to generate a return shipping label for the end-user computing device.

20. The system of claim 19, wherein the electronic remediation action comprises the return shipping label for the end-user computing device and wherein the electronic remediation action is communicated to the entity server.

* * * * *

UNITED STATES PATENT AND TRADEMARK OFFICE
CERTIFICATE OF CORRECTION

PATENT NO. : 11,755,988 B2
APPLICATION NO. : 16/441367
DATED : September 12, 2023
INVENTOR(S) : Robert J. Gillen It is certified that error appears in the above-identified patent and that said Letters Patent is hereby corrected as shown below:

In the Specification

Column 7, Line 35:
The line reading "cally associate or link an item identifier of the of the" should read --cally associate or link an item identifier of the--.

Column 8, Line 38:
The line reading "the of the end-user computing device 118 and pre-tender" should read --the end-user computing device 118 and pre-tender--.

Column 8, Line 39:
The line reading "diagnostic information for the of the end-user computing" should read --diagnostic information for the end-user computing--.

Column 8, Line 43:
The line reading "the of the end-user computing device 118. The transaction" should read --the end-user computing device 118. The transaction--.

Column 20, Line 9:
The line reading "Continuing with FIG. 7, the a block diagram of a com-" should read --Continuing with FIG. 7, a block diagram of a com- --.

Signed and Sealed this
Twenty-first Day of May, 2024

Katherine Kelly Vidal
*Director of the United States Patent and Trademark Office*